United States Patent [19]

Hauff

[11] Patent Number: 4,889,298

[45] Date of Patent: Dec. 26, 1989

[54] WALL FEEDTHROUGH FITTING

[75] Inventor: Werner Hauff, Dischingen, Fed. Rep. of Germany

[73] Assignee: Plastoform GmbH & Co. KG, Vlotho, Fed. Rep. of Germany

[21] Appl. No.: 231,884

[22] Filed: Aug. 12, 1988

[30] Foreign Application Priority Data

Aug. 14, 1987 [DE] Fed. Rep. of Germany ....... 3727160

[51] Int. Cl.$^4$ ............................................... H02G 3/22
[52] U.S. Cl. ......................................... 248/56; 174/48
[58] Field of Search ................. 248/56, 57, 68.1, 74.1, 248/74.4; 52/220, 221; 174/48, 151

[56] References Cited

U.S. PATENT DOCUMENTS

| | | | |
|---|---|---|---|
| 2,732,226 | 1/1956 | Brattberg | 248/68.1 |
| 3,282,544 | 11/1966 | Brattberg | 248/56 |
| 3,306,562 | 2/1967 | Bellefleur | 248/188.2 |
| 4,291,195 | 9/1981 | Blomquist | 174/48 |
| 4,677,253 | 6/1987 | Blomquist | 174/48 |
| 4,702,444 | 10/1987 | Beele | 248/56 |
| 4,733,016 | 3/1988 | Twist | 248/56 |
| 4,767,086 | 8/1988 | Blomquist | 248/56 |

FOREIGN PATENT DOCUMENTS

| | | |
|---|---|---|
| 958671 | 2/1957 | Fed. Rep. of Germany . |
| 2524113 | 12/1976 | Fed. Rep. of Germany ........ 248/56 |
| 3446503 | 8/1985 | Fed. Rep. of Germany ........ 174/48 |
| 641574 | 1/1979 | U.S.S.R. ................ 248/56 |

Primary Examiner—Ramon O. Ramirez
Assistant Examiner—Robert A. Olson
Attorney, Agent, or Firm—Herbert Dubno

[57] ABSTRACT

A feedthrough fitting seals around at least one conduit extending longitudinally through a wall opening forming two pairs of parallel inner side surfaces and forming longitudinally directed inner and outer peripheral surfaces. The fitting comprises a plurality of similar elastomeric liner blocks each extending the full width of the opening from one of the side surfaces thereof to the opposite parallel side surface thereof. Each block is formed with at least one interface surface directly engaging the interface surface of an adjacent block, at least one half seat on one of the interface surfaces complementary to the conduit and snugly engaging same, a nonplanar formation extending the full width of the opening on each of the interface surfaces and hermetically interfitting with the nonplanar formation of the adjacent block, and outwardly directed inner and outer lips that extend laterally past the respective opening and engage on the inner and outer peripheral surfaces. A tightener has a pair of wedges engaged between the blocks and an inner surface of the opening and a system for pulling the wedges longitudinally together and thereby pressing the blocks transversely together at their interface surfaces.

14 Claims, 7 Drawing Sheets

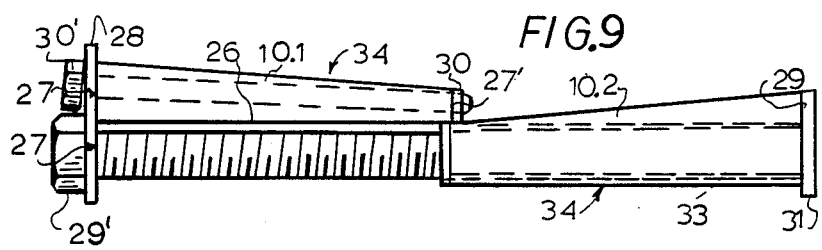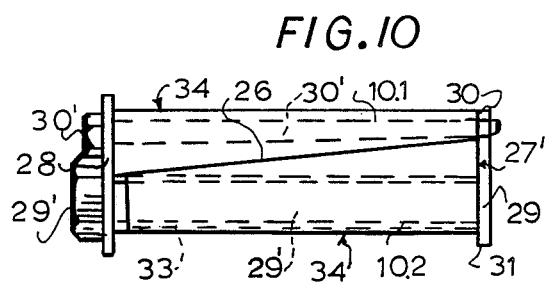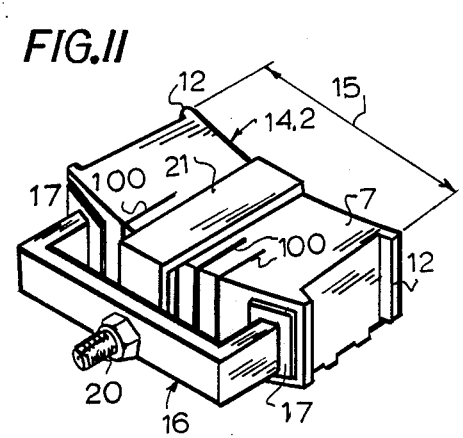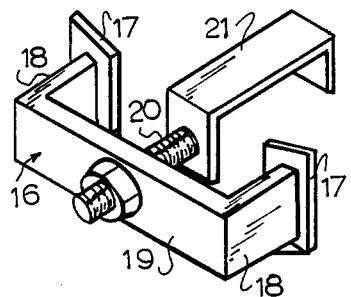

4,889,298

WALL FEEDTHROUGH FITTING

FIELD OF THE INVENTION

The present invention relates to a wall feedthrough fitting. More particularly this invention concerns such a fitting which can be tightened around the conduits passing through it.

BACKGROUND OF THE INVENTION

When conduits, whether they are constituted as pipes, hoses, electrical wires, or the like, pass through a wall it is normally necessary to seal tightly and hermetically around them. In particular in firecode construction it is necessary for the joint around the conduits to be of the same rating as the wall. Accordingly it is known to use wall feedthrough fittings comprising basically a sleeve that is fitted through the wall and through which the conduits pass longitudinally and a group of blocks that fit snugly between the conduits and the sleeve.

According to German patent 958,671 the blocks are generally parallepipedal and a plurality is used so that the joints or interface surfaces between adjacent blocks normally run both vertically and horizontally. These interface surfaces are, of course, formed with cutouts that together snugly embrace the conduits which are typically of circular section. The entire group of blocks is pressed tightly together by a plate that bears against all of them along one edge of the normally square sleeve and that can be pressed by bolts against these blocks. Once this plate is pushed in place to compress the blocks, the space it opens up must itself be plugged by other blocks.

In order to prevent extruding the blocks out of the opening, the plate is shaped complementarily to them and arranged flatly parallel on them. In addition between adjacent rows of such blocks there are stiffening plates with edges that hang over the ends of the blocks and that further inhibit their longitudinal movement when compressed. The blocks bear directly against the edges of the stiffening plates which are formed on the opposite sides with concave recesses so that the elastic blocks fill these recesses and thereby seal with the stiffening plates.

Such a system requires the use of relatively large compression forces to ensure a good seal. Unfortunately such pressure can damage some conduits, for instance electrical or fiber-optic cables. In addition this system is quite complicated and, therefore, expensive. It is also necessary for the installer stock a large supply of differently dimensioned blocks for the different conduits and sleeves. The provision of the stiffening plates further limits the placement of the conduits and often requires that the sleeve be much larger than would otherwise be necessary. Finally the prior-art system is almost impossible to rebuild once it is installed, as the blocks cannot be removed conveniently.

OBJECTS OF THE INVENTION

It is therefore an object of the present invention to provide an improved wall feedthrough fitting.

Another object is the provision of such an improved wall feedthrough fitting which overcomes the above-mentioned disadvantages.

Another object is to provide an improved method of assembling such a fitting and an improved tool for carrying out the method.

SUMMARY OF THE INVENTION

The feedthrough fitting according to this invention seals around at least one conduit extending longitudinally through a wall opening forming two pairs of parallel inner side surfaces and forming longitudinally directed inner and outer peripheral surfaces. The fitting comprises a plurality of similar elastomeric liner blocks each extending the full width of the opening from one of the side surfaces thereof to the opposite parallel side surface thereof. Each block is formed with at least one interface surface directly engaging the interface surface of an adjacent block, at least one half seat on one of the interface surfaces complementary to the conduit and snugly engaging same, a nonplanar formation extending the full width of the opening on each of the interface surfaces and hermetically interfitting with the nonplanar formation of the adjacent block, and outwardly directed inner and outer lips that extend laterally past the respective opening and engage on the inner and outer peripheral surfaces. A tightener has a pair of wedges engaged between the blocks and an inner surface of the opening and a system for pulling the wedges longitudinally together and thereby pressing the blocks transversely together at their interface surfaces.

Thus the system of this invention completely eliminates the use of stiffener plates while still ensuring the blocks are solidly anchored in the opening both with respect to the wall and to each other. In addition the wall opening can be made completely of concrete, without a steel liner, thereby substantially increasing its fire resistance.

According to this invention the nonplanar formations are tongue-and-groove formations. In addition the blocks each have a transversely inwardly directed face and a transversely outwardly directed face one of which is convex and projects past the respective peripheral surface. It is therefore possible to pull out a conduit simply by relaxing the clamping pressure, that is without pulling out the blocks. The formations will keep them in place while a conduit is pulled out and replaced with another conduit or with a plug.

In accordance with a further feature of the present invention the blocks each have a transversely inwardly directed face and a transversely outwardly directed face one of which is formed between the respective seats with slits. Furthermore the wall is formed with two such openings longitudinally spaced from each other and provided with respective such blocks and tighteners, the wall being provided between the inner peripheral surfaces with a lining sleeve. This lining sleeve has lips forming the inner peripheral surfaces and can be provided with a pair of caps releasably engageable with the lips and having outer surfaces lying on the inner side surfaces. The caps are emplaced when the wall is cast and removed before installation of the conduits.

The wedges according to the present invention extend parallel to the blocks and one of the wedges has a wide end generally at the outer peripheral surface and the other wedge has wide end generally at the inner peripheral surface. The wedges are pulled together by an abutment plate generally at the outer surface braced against the outer wall and bearing on the wide end of the one wedge, a presser plate bearing outwardly on the wide end of the other wedge, and bolts braced between the abutment plate and the presser plate for pulling same together and thereby pulling the wide ends of the wedges together. The one wedge has a narrow end generally at the inner peripheral surface and the fitting is provided with a second presser plate separate from the first-mentioned presser plate and bearing outward on the narrow end of the one wedge and second bolts separate from the first-mentioned bolts and engaged between the abutment plate and the second presser plate for pulling same together.

The second presser plate is outwardly engageable with the inner peripheral surface and the first presser plate is formed with sleeves longitudinally shorter than the one wedge and extending therein. These sleeves are internally threaded and the first bolts are threaded in the sleeves and have heads bearing on the abutment plate. The wedges have faces turned away from each other and extending parallel to each other and the abutment has aligned with the outer peripheral surface a plurality of threaded bores so that bolts threaded through the bores can push the abutment plate outward away from the wall. It is therefore possible to remove the tightener relatively easily once the clamping pressure is released for complete disassembly of the fitting without removal of the conduits.

The feedthrough fitting according to this invention is installed by first bowing each of the blocks so that the ridges at one face of the block can fit through the opening and inserting the block into the opening until the ridges are past the inner peripheral surface thereof, then fitting the blocks in the opening with the seats snug around the conduits and with one of the interface surfaces of one of the blocks engaging one of the side surfaces, another of the interface surfaces of another of the blocks engaging the tightener, and all the other interface surfaces engaging one another with the nonplanar formations interengaged, and finally thereafter pulling the wedges longitudinally together and thereby pressing the blocks transversely together at their interface surfaces. The blocks are bowed by a tool comprising a yoke having feet engageable with the one face of each block, a hook engageable with the other face of the each block between the feet, and means for pulling the hook toward the yoke and thereby bowing the block.

DESCRIPTION OF THE DRAWING

The above and other objects, features, and advantages will become more readily apparent from the following, reference being made to the accompanying drawing in which:

FIGS. 9 and 10 are large-scale side views of the tightener respectively before and after tightening;

FIG. 11 is an isometric view illustrating the use of an installation tool for the liner blocks of this invention; and FIG. 12 is an isometric view of the tool of FIG. 11.

SPECIFIC DESCRIPTION

Figure 1:
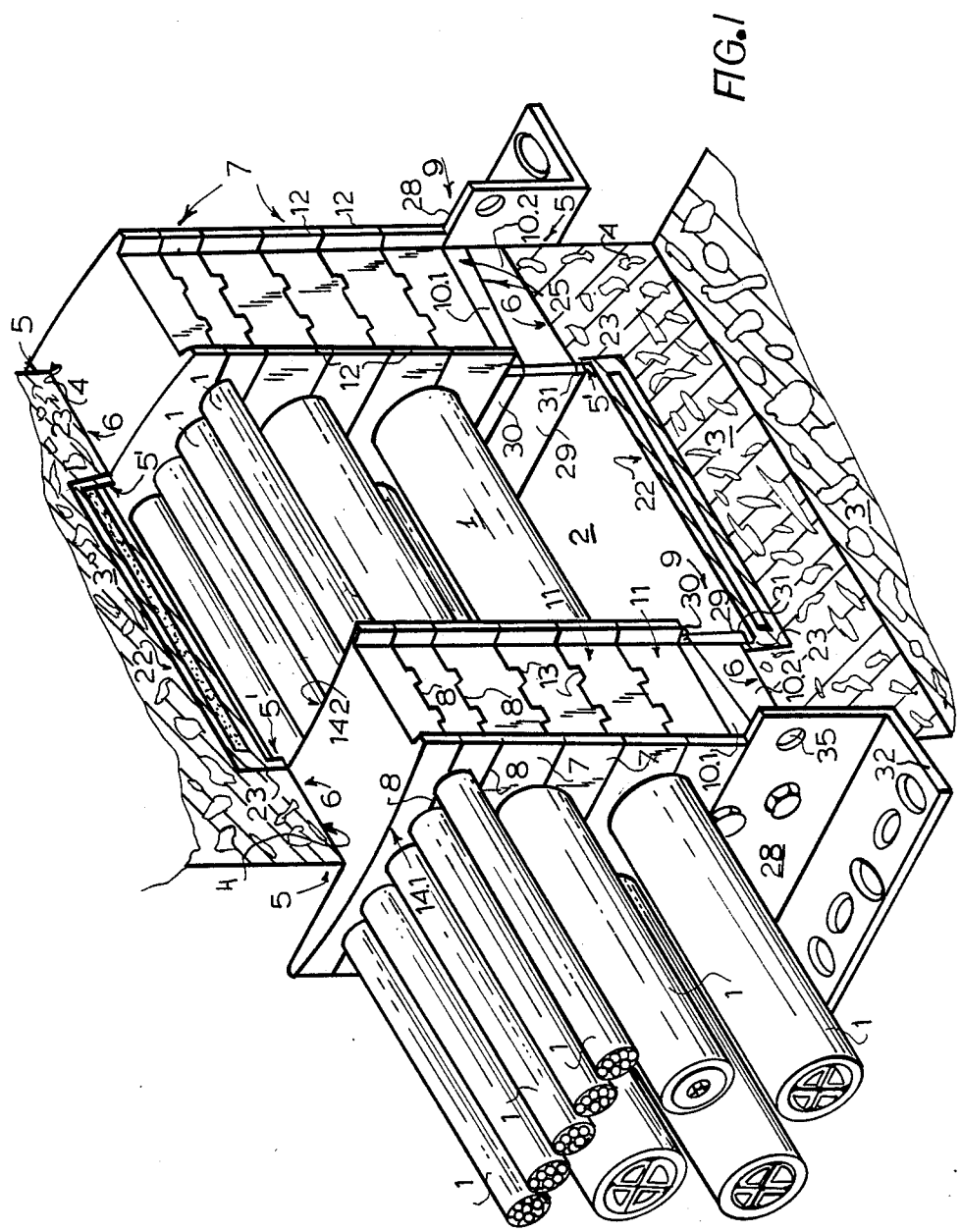
FIG. 1 is a partly sectional isometric view of a wall feedthrough fitting according to this invention mounted in a wall.

As seen in FIGS. 1 through 5 the wall feedthrough fitting according to this invention serves to seal between a plurality of longitudinally extending and parallel conduits 1 and a pair of aligned identical openings 4 formed along a passage 2 through a wall 3, here a poured concrete structure. Each opening 4 is of square shape and has outwardly and inwardly facing rim surfaces 5 and 5' separated by four planar inner surfaces 6. The space in each opening 4 between the conduits 1 and the surfaces 6 is completely filled by Neoprene liner blocks 7 that abut each other at interface surfaces 8 and by a tightener 9 comprised basically of two wedge-section bars 10.1 and 10.2.

According to this invention the liner blocks 7 are formed at the interface surfaces with cutouts 7' that complementarily fit around the conduits 1 and these blocks are formed as solid elastomeric bars that extend the full width of the opening 4. The end surfaces of the blocks 7 flatly abut the respective surfaces 6 and the blocks 7 are somewhat longer than the surfaces 6 and have end ridges 12 that overreach the surfaces 5 and 5', effectively locking the blocks 7 in the openings 4 against longitudinal movement and imparting to each block 7 as seen from above, an H-section. Furthermore the interface surfaces 8 where the blocks 7 abut one another flatly are formed with transversely throughgoing tongue-and-groove formations 13 that prevent relative longitudinal movement of adjacent liner blocks 7.

As illustrated in FIGS. 1 and 12 the blocks 7 are inserted in the openings 4 by means of a tool 16 that bends them so their outside surfaces 14.1 are concave and inside surfaces 14.2 are convex. This tool 16 comprises a U-shaped yoke formed of a pair of legs 18 bridged by a bight portion 19 and each having a foot portion 17, and by a hook 21 that can be pulled toward the yoke by a screw 20. Thus the hook 21 is engaged over the block 7 as shown in FIG. II to press against its inner surface 14.2 and the feet 17 are engaged adjacent the block ends on the front face 14.1. Then the screw 20 is actuated to pull in the hook 21, thereby bowing the block 7 and reducing its width at the inner ridges 12 to a size 15 that is slightly less than the width of the opening 4 through which the block 7 is to be inserted. To facilitate such bowing the elastomeric bar 7 is formed with slits 100 that are open on and are perpendicular to its outer face 14.1. Once thus bowed it is possible to insert the block 7 through the opening 4, whereupon the screw 20 is released so that block 7 can straighten out and bear flatly on the side faces 6 of the opening 4.

Figure 6:
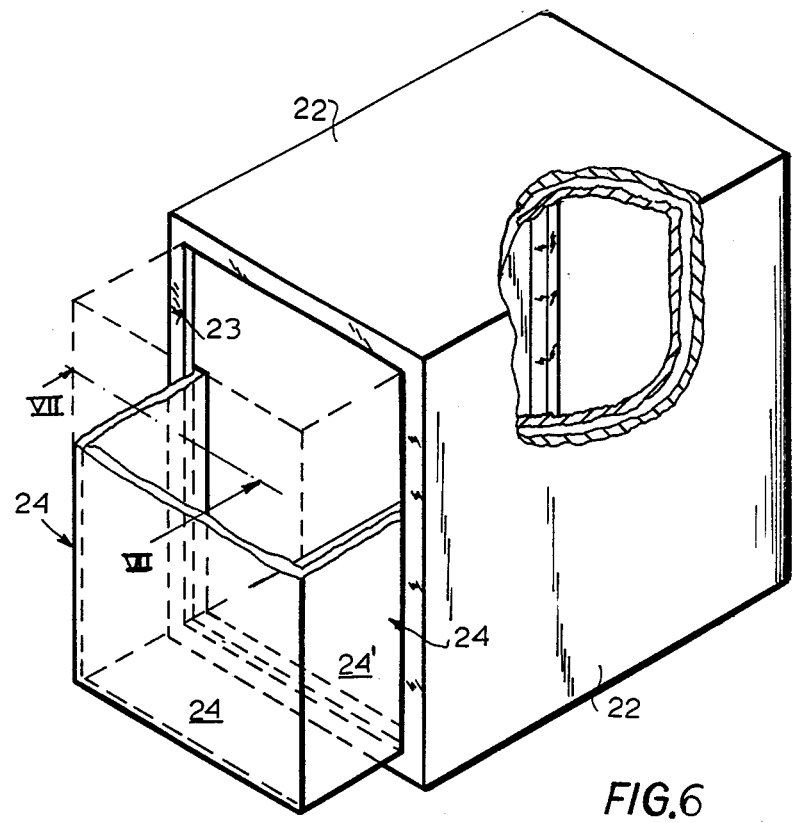
FIG. 6 is a partly broken-away isometric view of the liner box of the fitting of this invention.
Figure 7:
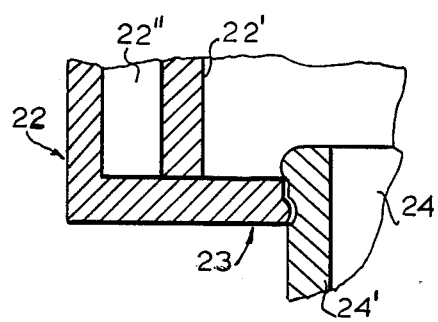
FIG. 7 is a large-scale section taken along line VII—VII of FIG. 6.

As also seen in FIGS. 1 through 5 and in FIGS. 6 and 7 in detail, the wall passage 2 and both openings 4 are formed by a liner box 22 of double-wall configuration and having an inner surface 22' turned toward the conduits 1 and a cavity 22'' filled with a fire-retardant chemical. In addition at its ends this tubular box 22 has lips 23 that actually lie on and form the inner rims 5' of the openings 4. The openings 4 themselves are formed by snap-fit boxes 24 that fit with the lips 23 and that have side walls 24' that actually form the inner opening surfaces 6. This assembly is inserted in the form before the wall 3 is poured and, once the concrete has set, the boxes 24 are pulled out to form the openings 4.

Figure 2:
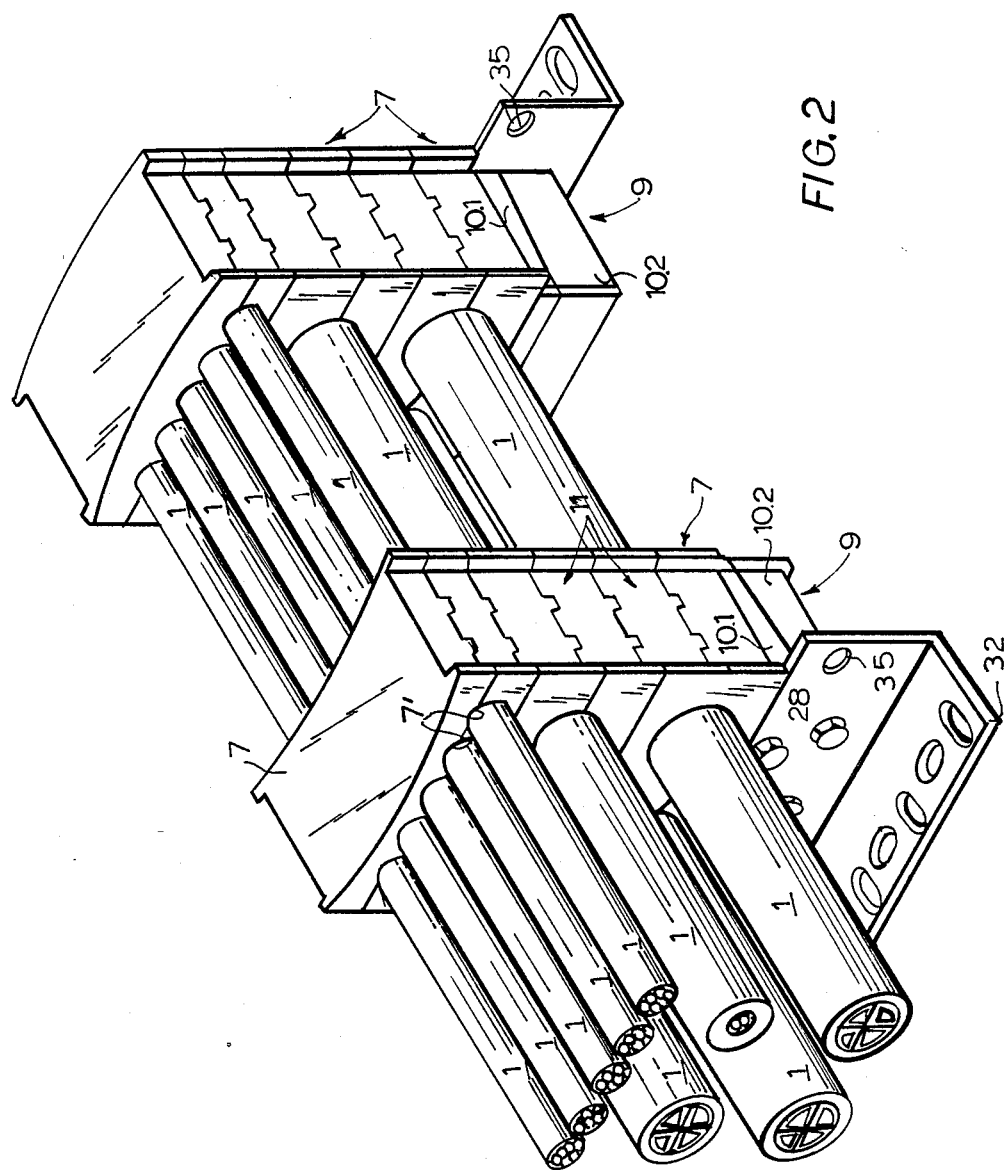
FIG. 2 is an isometric view of the fitting all alone.
Figure 3:
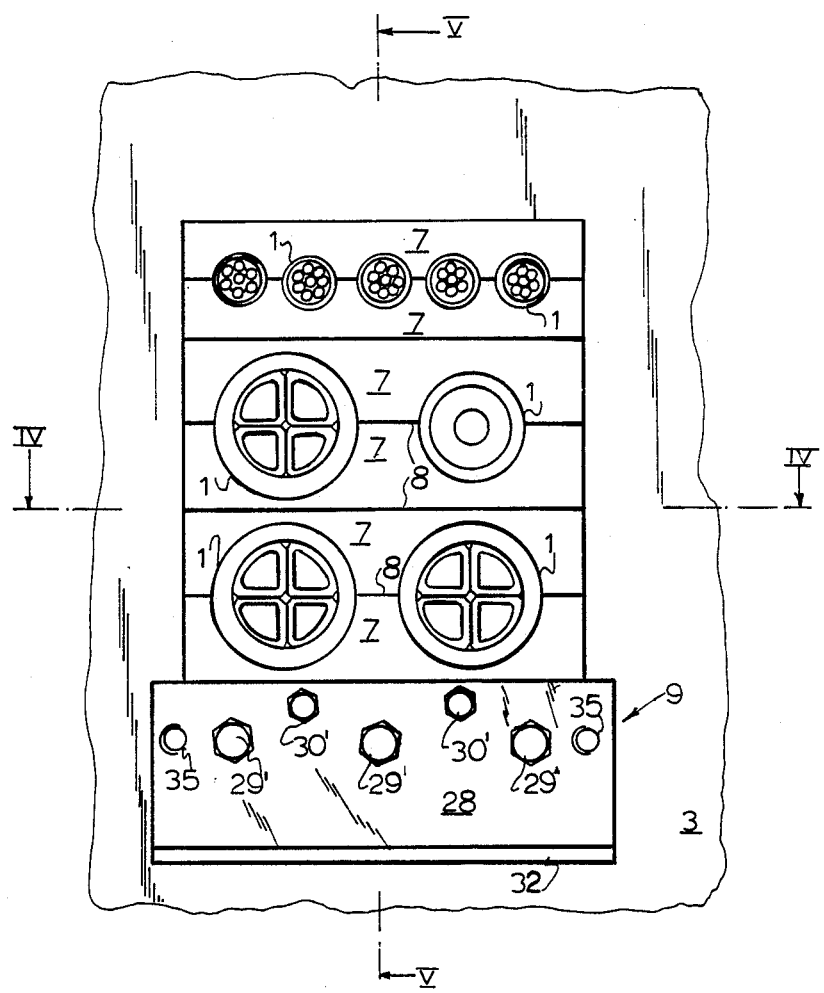
FIG. 3 is an end view of the fitting as seen in FIG. 1.
Figure 4:
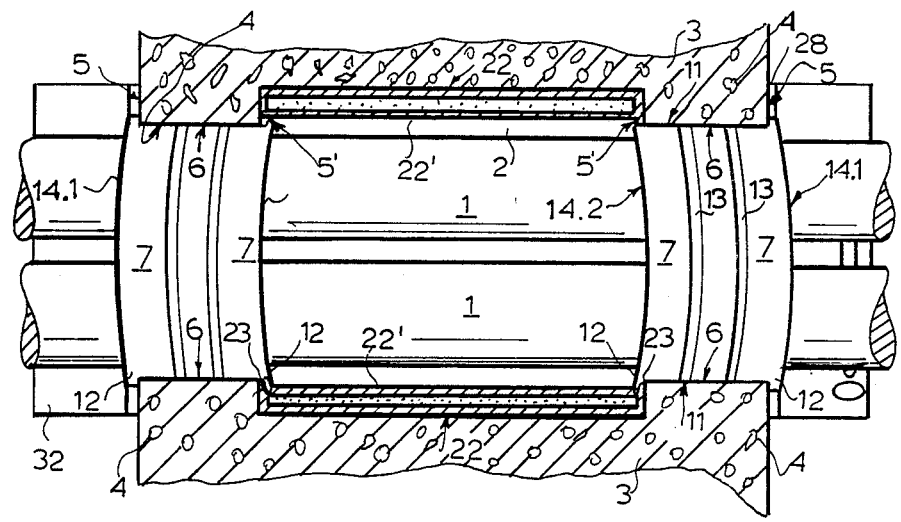
FIGS. 4 and 5 are sections taken respectively along lines IV—IV and V—V of FIG. 3.
Figure 5:
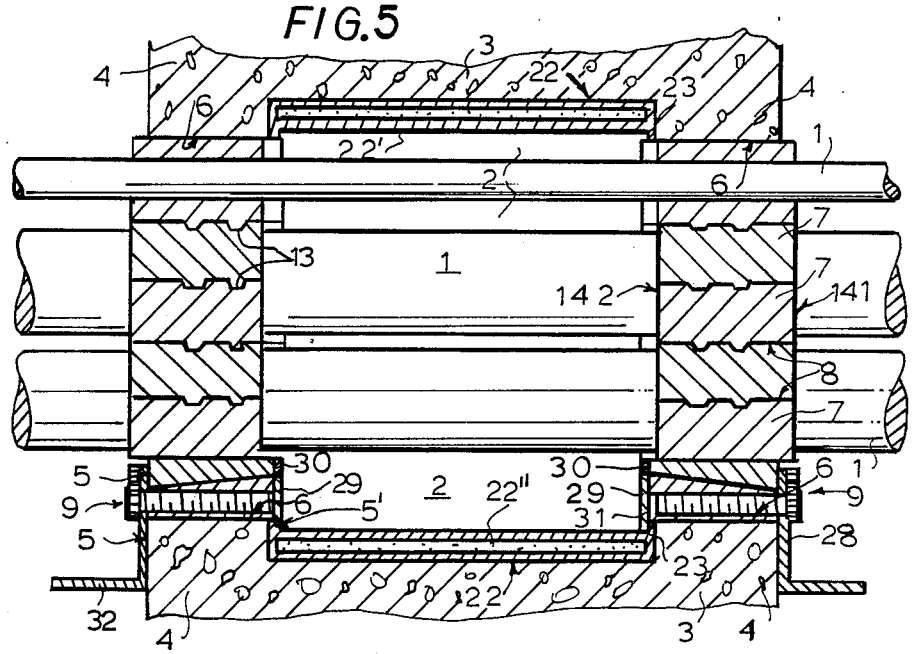
Figure 8:
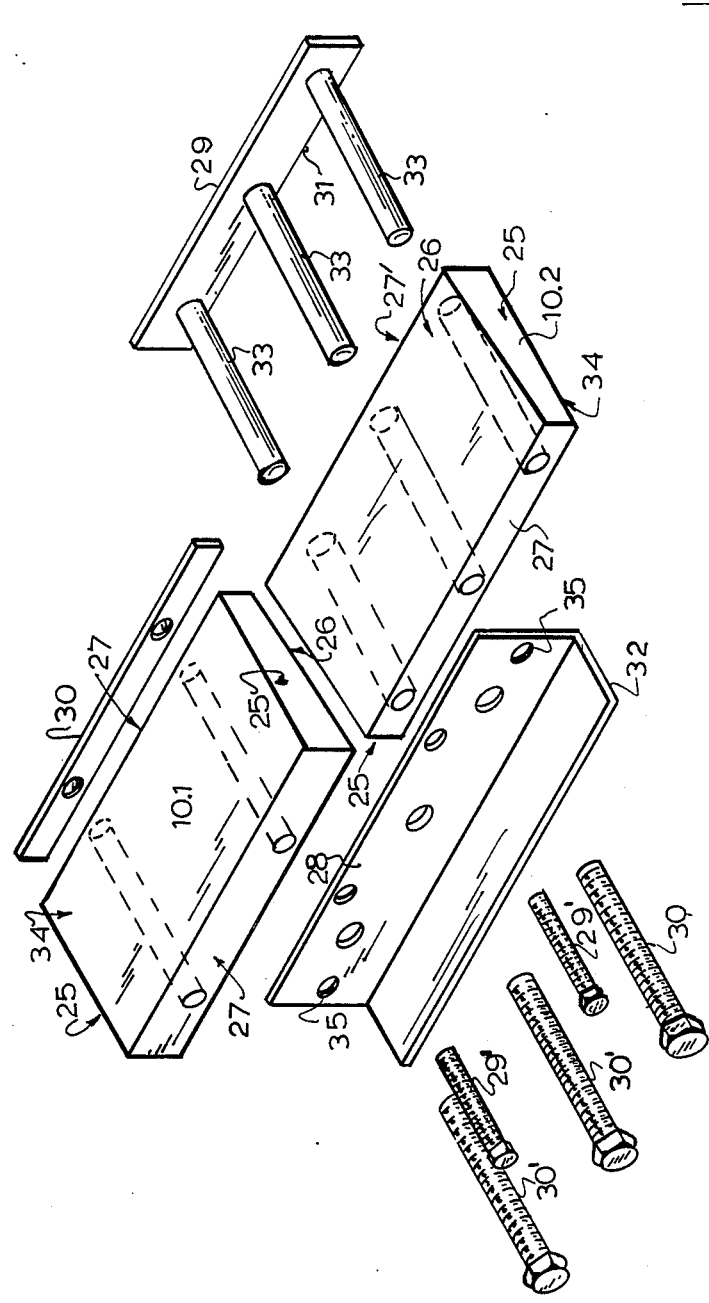
FIG. 8 is an explored isometric view of the tightener of the fitting of this invention.

Each tightener, as seen in FIGS. 8, 9, and 10 comprises the two wedge-shaped bars 10.1 and 10.2 whose end surfaces 25 engage the side surfaces 6 flatly and whose mutually engaging surfaces 26 run at an angle to the upper and lower surfaces 34 of the two bars 10.1 and 10.2 together. On the outside of the bars 10.1 and 10.2 is a vertical plate 28 formed as an angle iron with a flange 32 punched out as shown in FIG. 2 to act as a cable guide or attachment point, and on the inside of these bars 10.1 and 10.2 are respective presser bars 30 and 29. The presser bar 29 has a lower edge 31 and is provided with three internally threaded tubes that pass through complementary throughgoing bores in the lower bar 10.2 aligned with holes in the plate 28. Hex-head bolts 30 passing through the plate 28 are threaded into these tubes 33. Similarly upper bolts 29' pass through unthreaded holes in the plate 28 and engage through holes in the upper bar 10.1 with threaded holes in the upper presser bar 30.

These bolts 29' are substantially longer than the bar 10.1 measured longitudinally.

Thus after the blocks 7 have been fitted into the opening by means of the tool 16 and fitted around the conduits 1, the tightener in the position of FIG. 9 is slipped under or over the stack of blocks 7, normally under. The edge 31 of the inner plate 29 is hooked over the inner rim surface 5' formed by the rim 23 and the bolts 29' are tightened until the plates 28 and 29 are tightly drawn against the respective rim surfaces 5 and 5'.

Then the upper bolts 29' are tightened at least until the inner end surface 27 of the upper block 10.1 is flush with the inner end surface 27' of the lower block 10.2. Normally in this position, which is shown in FIG. 10, the blocks 7 are sufficiently snug, but if not it is possible to further tighten the bolts 29' for added compression of the blocks 10.1 and 10.2 and consequent vertical spreading of them. The vertical compression created by the tightener 9 plus the interfit of the formations 13 ensures a hermetic fit between the blocks 7 and the conduits 1.

To disassemble the joint, the bolts 29' and 30' are unscrewed to release all tension in the bars 10.1 and 10.2 and bolts are threaded into threaded bores 35 in the plate 28, into engagement with the face of the wall 3. This makes it possible to exert considerable outward force on the tightener 9 by rotating these not illustrated bolts for withdrawal of the tightener 9 from the opening 4.

I claim:

1. In combination with a wall formed with an opening forming two paris of parallel inner side surfaces and forming longitudinally directed inner and outer peripheral surfaces and at least one conduit extending longitudinally through the opening, a feedthrough fitting comprising:
   a plurality of similar elastomeric liner blocks each extending the full width of the opening from one of the side surfaces thereof to the opposite parallel side surface thereof, each block being formed with
   at least one interface surface directly engaging the interface surface of an adjacent block,
   at least one half seat on one of the interface surfaces complementary to the conduit and snugly engaging same,
   a nonplanar formation extending the full width of the opening on each of the interface surfaces and hermetically interfitting with the nonplanar formation of the adjacent block, and
   outwardly directed inner and outer lips that extend laterally past the respective opening and engage on the inner and outer peripheral surfaces; and
   a tightener having
   a pair of wedges engaged between the blocks and an inner surface of the opening, and
   means for pulling the wedges longitudinally together and thereby pressing the blocks transversely together at their interface surfaces.

2. The feedthrough fitting defined in claim 1 wherein the nonplanar formations are tongue-and-groove formations.

3. The feedthrough fitting defined in claim 1 wherein the blocks each have a transversely inwardly directed face and a transversely outwardly directed face one of which is convex and projects past the respective peripheral surface.

4. The feedthrough fitting defined in claim 1 wherein the blocks each have a transversely inwardly directed face and a transversely outwardly directed face one of which is formed offset from the respective seat with slits.

5. The feedthrough fitting defined in claim 1 wherein the wall is formed with two such openings longitudinally spaced from each other and provided with respective such blocks and tighteners, the wall being provided between the inner peripheral surfaces with a lining sleeve.

6. The feedthrough fitting defined in claim 5 wherein the lining sleeve has lips forming the inner peripheral surfaces.

7. The feedthrough fitting defined in claim 6, further comprising
   a pair of caps releasably engageable with the lips and having outer surfaces lying on the inner side surfaces, whereby the caps are emplaced when the wall is cast and removed before installation of the conduits.

8. The feedthrough fitting defined in claim 1 wherein the wedges extend parallel to the blocks and one of the wedges has a wide end generally at the outer peripheral surface and the other wedge has wide end generally at the inner peripheral surface, the means for pulling the wedges longitudinally including:
   an abutment plate generally at the outer surface braced against the outer wall and bearing on the wide and of the one wedge;
   a presser plate bearing outwardly on the wide end of the other wedge; and
   bolts braced between the abutment plate and the presser plate for pulling same together and thereby pulling the wide ends of the wedges together.

9. The feedthrough fitting defined in claim 8 wherein the one wedge has a narrow end generally at the inner peripheral surface, the fitting further comprising:
   a second presser plate separate from the first-mentioned presser plate and bearing outward on the narrow end of the one wedge; and
   second bolts separate from the first-mentioned bolts and engaged between the abutment plate and the second presser plate for pulling same together.

10. The feedthrough fitting defined in claim 9 wherein the second presser plate is outwardly engageable with the inner peripheral surface.

11. The feedthrough fitting defined in claim 9 wherein the first presser plate is formed with sleeves longitudinally shorter than the other wedge and extending therein.

12. The feedthrough fitting defined in claim 11 wherein sleeves are internally threaded and the first bolts are threaded in the sleeves and have heads bearing on the abutment plate.

13. The feedthrough fitting defined in claim 9 wherein the wedges have faces turned away from each other and extending parallel to each other.

14. The feedthrough fitting defined in claim 9 wherein the abutment has aligned with the outer peripheral surface a plurality of threaded bores, whereby bolts threaded through the bores can push the abutment plate outward away from the wall.

* * * * *